G. W. HATCH.
Fifth Wheel.
No. 3,627.                                        Patented June 13, 1844.
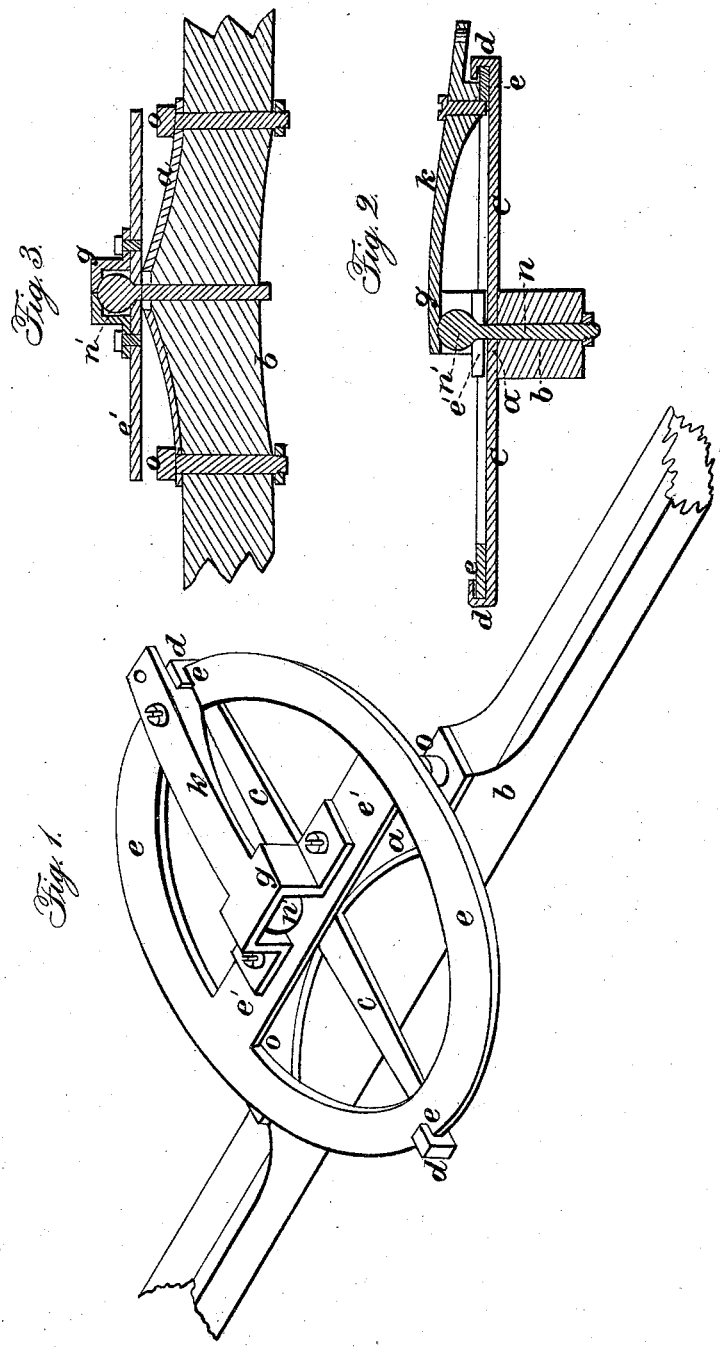

UNITED STATES PATENT OFFICE.

GEO. W. HATCH, OF PARKMAN, OHIO.

COUPLING FOR CARRIAGES, WAGONS, AND OTHER WHEELED CARRIAGES.

Specification of Letters Patent No. 3,627, dated June 13, 1844.

*To all whom it may concern:*

Be it known that I, GEORGE W. HATCH, of Parkman, in the county of Geauga and State of Ohio, have invented a new and Improved Method of Constructing Couplings for Wagons and Carriages; and I do hereby declare that the following is a full and exact description.

The nature of my invention consists in providing the forward axletree of a wagon or carriage with a coupling which will allow the forward axletree an easy horizontal and vertical motion.

To enable others skilled in the art to make and use my invention I will proceed to describe its construction and operation.

I construct my wagons or carriages after any of the known forms, and attach to the upper side of the forward axletree ($b$) a plate ($a$), of wrought iron or other metal, which is provided with arms ($c$) extending forward and aft, the outer ends of which are turned upward and inward as at ($d$), and form hooks to receive the circular plate ($e$) as shown in Figures 1 and 2, letters $e$, $e$. Through the center bar of this plate is a hole, Figs. 2, 3, to receive the king bolt ($n$) which passes perpendicularly through the axletree, to which the plate is bolted, and from this center hole the plate ($a$) is curved downward sufficiently to allow the rocking of the circular plate ($e$). The increasing or diminishing the amount of play may be regulated by increasing or diminishing the heads of the bolts, Figs. 2 and 3, letter ($n'$).

The circular plate is formed of wrought iron or other metal, constructed after the form of a common circular plate, with a bar ($e'$) across it provided with a hole in the center through which the king bolt also passes. This hole is counter-sunk, forming a concave upon which the lower part of the king bolt head rests. The king bolt is formed of a round rod of iron or steel, with a head in form of a globe or ball, Figs. 1, 2, 3, letter ($n'$).

A cap, Figs. 1 and 2, letter $g$, is bolted to the cross bar ($e'$) in the circular plate and is elevated in the center and counter-sunk, forming a concave which rests upon the head of the king bolt. From the center of this cap an arm, Figs. 1, 2, and 3, letter $k$, extends backward and is bolted to the rim of the circular plate, and also to the under side of the reach. This is not shown in the drawings, but will be readily understood by a mechanic.

What I claim as my invention and desire to secure by Letters Patent, is—

1. The combination of the circular plate with the curved lower plate, the former being embraced by the hooks projecting from the latter and in combination with these.

2. I also claim the globe head of the king bolt, fitting in the concave of the cross bar for the purpose and in manner described.

GEORGE W. HATCH.

Witnesses:
WM. GLENDENING,
JOSIAH B. BRACE.